UNITED STATES PATENT OFFICE.

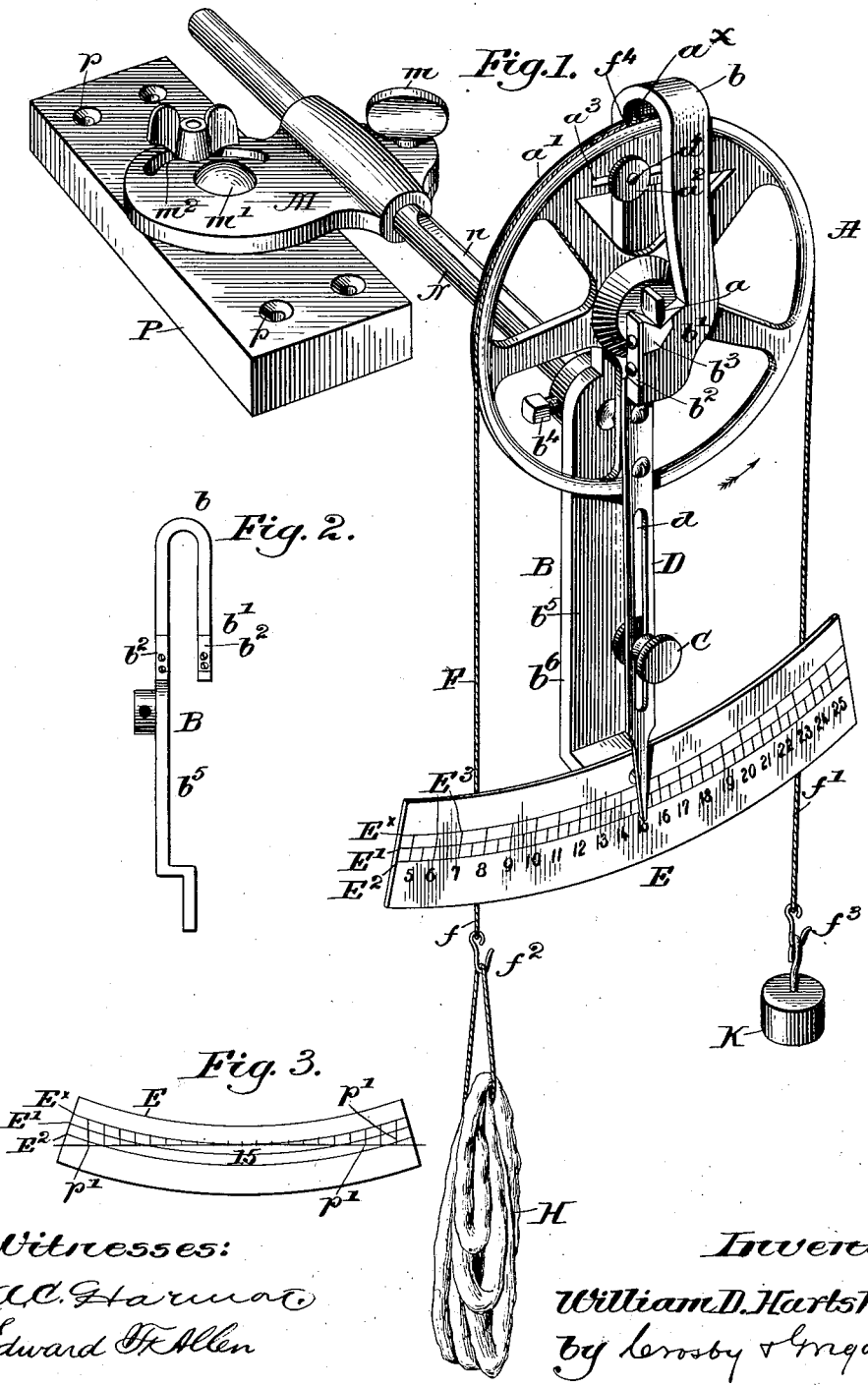

WILLIAM D. HARTSHORNE, OF METHUEN, MASSACHUSETTS.

APPARATUS FOR THE QUANTITATIVE DETERMINATION OF MOISTURE IN YARN.

SPECIFICATION forming part of Letters Patent No. 648,868, dated May 1, 1900.

Application filed August 2, 1897. Serial No. 646,731. (No model.)

*To all whom it may concern:*

Be it known that I, WILLIAM D. HARTSHORNE, of Methuen, in the county of Essex and State of Massachusetts, have invented an Improvement in Apparatus for the Quantitative Determination of Moisture in Yarn and the Like, of which the following description, in connection with the accompanying drawings, is a specification, like letters on the drawings representing like parts.

The hygroscopic property of many substances, and especially of wool and other staples, introduces into their economic manipulation a factor which owing to changes in atmospheric conditions is always an uncertain element and has long been a cause of great inconvenience to manufacturers and a source of uncertainty as to the intrinsic value of the output where sold by the pound or a guaranteed weight per yard. The variable nature of this factor manifests itself at an early stage in preparation of staples, and in the drawing and spinning particularly affects the apparent count or fineness of the yarn spun to a serious degree, for the reason that no satisfactory method exists for the speedy determination of the absolute quantity of moisture held by the fiber at any given time during its treatment, no means extant, aside from the unsatisfactory performance of the machinery, to show satisfactorily that such changes are taking place, and nothing whatever to indicate the rate or condition of such change. A change of gear to correct the count of yarn from time to time is a necessary expedient if the actual dry weight of roving has changed; but where the change in weight is purely one of hygroscopic condition such a change of gear is manifestly improper and can only result in further irregularity and uncertainty of result. This hygroscopic condition varies greatly for different materials in the same atmosphere and is one which a long series of experiments on wool, as an example, has shown to be dependent not only upon the so-called "relative humidity" of the atmosphere, but also upon its temperature and barometric pressure. The relationship, however, even if it can be mathematically expressed, is one which cannot be determined from a simple inspection of the wet and dry bulb thermometers, nor by any simple calculation therefrom, so far as known, so that although rules are sometimes laid down by mill-superintendents for maintaining the relative humidity and temperature at given points in the successive rooms of manufacture by moistening, heating, or other devices, yet there is no certain knowledge conveyed thereby as to the specific effect upon the particular material operated upon. At no stage does the moisture factor attain such manifest importance, however, as in the uncertainty which the buyer or vender of yarn experiences regarding the actual amount of workable material contained in the mass sold.

In some markets sales are made subject to the "conditioning-house test," applied to sundry staples taken at random from the mass delivered. This is a method well known to the trade in England and on the continent. The samples are first weighed and then dried at a standard temperature until they cease to give up moisture, when they are weighed again, the average loss in weight being taken to indicate the proportion of moisture held by the original mass to the entire weight thereof, and by this means the actual weight of the fiber contained in the mass is determined. Even without setting forth in detail the correction thereafter made upon the basis of an arbitrary standard to establish the amount of money with which the vender's bill is to be debited or credited by reason of the variation in the amount of moisture, greater or less, from the required standard, it is obvious that the application of this test to every sale, great or small, is, to say the least, tedious, expensive, and, if necessary, a burden upon trade. That such necessity exists under present mill conditions is well recognized abroad, and that it also exists at present in this country, if buyer and vender would be just with each other, is manifest from the great and rapid variation in atmospheric conditions to which we are subject. If, however, the atmospheric condition of the immediate environment in which treatment of the staple is carried on could be maintained at a uniform state, it is obvious that the amount of moisture which the product would contain at the end of the operation could be inferred with much greater certainty than is now possible and the necessity for any tests, save one or two, eliminated.

The ability to maintain uniform atmospheric conditions in a given room is dependent upon three chief factors—viz., the ability to control the temperature by warming or cooling the air at will, similarly the ability to control the degree of moisture present by adding to or taking away from the same, and as a necessary condition precedent to the proper regulation of these a method of and apparatus for ascertaining the effect of their exercise, the result being preferably expressed in terms of the hygroscopic capacity of the substance under treatment. The provision of such a method and apparatus is the object of this invention, the various features of which will be fully illustrated and described in the accompanying drawings and specification and set forth in the claims.

Figure 1 is a view in perspective of the preferred form of apparatus by which my invention may be carried into effect. Fig. 2 is a side elevation, on a reduced scale, of the support B looking to the right, Fig. 1. Fig. 3 is a diagrammatic view illustrative of the method of plotting the scale E.

My method for determining the quantity of moisture held at any moment in a given quantity, by weight, of wool or other hygroscopic substance, free to absorb moisture from the surrounding air, consists, briefly, in first determining the weight when "bone dry" of a quantity of the substance of convenient size—as, for example, a skein of woolen yarn—then supporting the same freely in the environment characteristic to the treatment of the substance selected, which may be in this instance the "conditioning-room" of a mill, and finally determining by suitable means the increment of its weight while in the environment selected over the bone-dry weight. This increment will be the exact measure of the moisture held in the skein or other sample at the instance of observation, and the variations in this increment serve to indicate exactly the variations of humidity in the adjacent atmosphere of the room or other suitable environment. It will readily be seen that from a series of periodical observations of the moisture indications furnished by such a sample, whereof the actual bulk and situation remain unchanged, the normal degree of humidity in the selected environment can easily be calculated. So, also, by comparing with such a moisture-record the quality of the product turned out at different times in the environment wherein the record has been taken the condition of moisture most favorable to the desired grade of product may be determined with equal facility and a basis furnished for subsequent correction or regulation of humidity, according to and concurrently with variance from the normal indications thereafter observed in the sample, or "standard," as it will hereinafter be called at times.

It will be well to note that when a sample of wool or the like has been brought to the bone-dry state its hygroscopic capacity thereafter is slightly less than that of wool, &c., in its "conditioned" form, and inasmuch as the most important data sought after are the quantities of moisture in conditioned wool the bone-dry weight of the standard should be determined not by drying it, but by drying another sample exactly equal in normal weight, &c., to that which is to become the standard. Thus the standard will not have to be subjected to impairment of its hygroscopic capacity, and accordingly the indications of its condition will serve as a basis from which to infer the moisture condition of substances of the same hygroscopic capacity produced or treated in the immediate environment of the standard.

Having thus set forth my method, I will now describe the apparatus which I have invented for aiding to carry the method into effect in a convenient manner. This instrument consists, essentially, of a wheel A, carried by a support B in such a manner that it is free to rotate and normally maintained at rest in a given position by a weight C, attached to the wheel at a point outside its axis by suitable means, preferably an arm or pointer D, which latter also serves to indicate the extent of rotation or departure of the wheel from its normal position of rest. As an aid to the convenient observation of these indications a scale E is mounted on the lower portion of the support B opposite the pointer, the division of the scale being plotted in a manner to be described later. The support B is composed of an upright bar of suitable material, preferably steel, bent upon itself at its upper end to form a yoke, the upper or closed portion $b$ of the yoke being preferably offset laterally in this instance, as illustrated, to the right of the transverse medial vertical plane of the support to form shoulders $b'$ $b'$, on which are seated and firmly held, as by screw-plates $b^2$ $b^2$, the bearings $b^3$ $b^3$ for the knife-edge axis $a$ of the wheel A. These bearings, of which only one is shown in Fig. 1, may be of such material and construction as is usual in instruments of precision; but I prefer that agate be used, grooved in such a manner as to cause the knife-edge $a$ to position itself in a line lying in the transverse medial vertical plane of the support and perpendicular to the longitudinal axis of the latter. The knife-edge $a$ may likewise be of any suitable material and integral with the material of the wheel if the requisite precision can be secured; but I have found it advisable to use a separate knife-edge of hardened steel positioned with the greatest nicety at the axis of the wheel. As a further precaution to insure the precision in the location of the knife-edge I prefer to machine the periphery of the wheel A after the knife-edge has been fixed in adjusted position, the object of this machining being, primarily, to provide a true circular seat $a'$ (preferably grooved, as illustrated) for a flexible cord F, of silk or the like, the depending ends $ff'$ of which are provided with means (shown as hooks $f^2 f^3$) for the attachment, respectively, of the hygroscopic substance H—in this instance a skein of wool—on the one and a counterweight K, of non-hygroscopic material, on the other. Suitable means should be provided to prevent slipping of the cord F in the groove, and as a convenient device to accomplish this I have illustrated a projection $a^×$ from the periphery of the wheel engaging a loop $f^4$ in the cord.

To afford means for readily setting up the instrument and adjusting it in position, I provide a swivel-clamp M, carrying a rod N, to one end of which is attached the support B by suitable means, as a set-screw $b^4$. The rod N is capable of longitudinal adjustment in the clamp, in which it may be fixed by the thumb-screw $m$, while the clamp in turn is free to move about its central pivot $m'$ and may be secured in adjusted position by the slot, pin, and set-screw connection $m^2$. For the sake of convenience the clamp M is shown as permanently attached to a block P, which may be secured in place, as desired, by screws or the like, for which are provided holes $p$. The parts N and B are very accurately machined at their region of union, so that the rod N will be in parallelism with the knife-edge $a$, and to aid in bringing this edge to a true horizontal the rod N is slabbed off on its upper surface $n$, where a spirit-level may be applied during the adjustment of the clamp. So, also, the edge $b^6$ of the leg $b^5$ of the support B is machined parallel with the transverse longitudinal plane of the support to furnish a correct bearing for the level while the longitudinal axis of the support is being brought to a true vertical. The support having been thus set up and the wheel set in its bearings, the pointer D should stand opposite the middle figure of the scale—in this instance marked "15"—which lies in a vertical plane passing through the knife-edge, and if the pointer does not so stand its position is corrected by shifting a correcting-weight $a^2$, carried by the wheel A, in a slot $a^3$. As this adjustment is permanent, this weight is preferably adapted to be secured in place by a draft-screw $a^4$. When the pointer has thus been brought to the vertical, the cord F being in place, the sample of hygroscopic substance of known bone-dry weight—say, a skein of wool H, weighing when bone dry one hundred grams—is suspended from that one of the hooks which hangs adjacent the side of the scale indicating low moisture degrees—in this instance hook $f^2$—and upon the other hook is hung the counterweight K.

As the normal degree of moisture which wool will absorb in a given locality can be roughly determined and as it is convenient to start with that approximate normal as the middle point of the scale, we will assume for illustration that in the room when the instrument has been set up the amount of moisture normally absorbed by wool is fifteen grams. Accordingly the middle point of the scale is marked "15," and it is obvious that with the bone-dry weight of the sample H one hundred grams and the moisture contained by it under normal conditions fifteen grams the total weight of the sample under normal conditions will be one hundred and fifteen grams, so that to balance this weight and cause the pointer D to stand opposite the middle point of the scale the counterweight K must weigh one hundred and fifteen grams. It will now be understood that an accession to the moisture in the air of the room with its absorption by the wool will be accompanied by an increase in the weight of the latter, and the counterweight K being overbalanced the wheel A will be rotated in the direction of the arrow, causing the pointer D to swing to the right. The extent of this displacement will be in proportion to the amount of moisture absorbed by the wool, and inasmuch as the "lever-arm" of the pointer and its weight C—i. e., the power of the same to resist displacement—increases in proportion to the sine of the angle of its departure from the vertical the scale E is plotted (see Fig. 3) as follows—viz., an arc $E^×$ of a circle having the axis of the wheel A as its center is drawn, and at the point where this arc cuts the vertical—i. e., at "15," a straight line is drawn tangent to the arc. From this line perpendiculars $p'$ are erected at equal intervals, all intersecting the arc $E^×$ and equal in number to the desired divisions in the range of weights of moisture through which the hygroscopic substance can run. For example, the amount of moisture absorbed by one hundred grams of wool will vary at different times from about five grams to twenty-five grams, and accordingly the scale illustrated has a corresponding number of divisions indicating grams and fractions thereof. The range for cotton is about eight to fifteen and the range varies similarly in different substances, so that the size of the scale may be varied as found convenient, though the principle of construction will remain the same. The extra arcs $E'$ and $E^2$ are concentric with the arc $E^×$ and, together with the radial cross-lines $E^3$, are merely added to aid the vision, having nothing to do with the plotting of the division-points on the arc $E^×$, which are determined according to the method above described—i. e., by the intersection of the arc with perpendiculars erected at equal intervals from a horizontal line. To calibrate the pointer and scale, a known weight is added to one hook or the other and the deflection of the pointer noted—e. g., if a weight of two grams be added to the counterweight K the pointer would indicate "13," and if it does not the weight C is adjusted in the slot $d$ until the indications of the pointer register with the divisions of the scale. Once calibrated the instrument furnishes an accurate, absolute, and continuous indication of the varying quantities of moisture held in the sample or standard and by indicating the condition of the standard indicates necessarily the condition of its environing atmosphere, and if every portion of the quantity of the substance whose condition it is desired to determine from the standard be equally free with the standard to take up moisture from the atmosphere and the exposure be sufficient it will suffice to simply weigh the quantity and deduct from the total weight thereof the proportion of moisture which the instrument indicates to be present in the standard, since the same proportion will be present in the quantity, the quality and environment being the same. Closely-packed masses, however, should not be tested as above. It is obvious, nevertheless, that the product of a manufactory, the atmosphere whereof has been regulated in accordance with the indications furnished by such an instrument, may be made of such a uniform character that one or two conditioning-house tests of samples taken from the first and last masses constituting a quantity of wool purchased will furnish the necessary data as satisfactorily as a large number of tests, where the atmosphere was regulated by "rule of thumb" as heretofore. It will further be noted that in the case I have instanced in this specification, with the weight of the standard when bone dry one hundred grams and the instrument constructed to read in grams, the indication gives directly at the time of any observation the percentage of moisture to the bone-dry weight—e. g., at the normal, fifteen per cent.; when indicating twelve grams, twelve per cent; when indicating twenty-five grams, twenty-five per cent., &c. While this is a convenient form in which to give the indications, still I wish it understood that I do not limit myself to any single form of indication nor to any given material nor mode of construction, nor in general otherwise than as set forth in the claims.

Having fully described my invention, what I claim, and desire to secure by Letters Patent, is—

1. An instrument of the class described, comprising a support B provided with a scale E, a yoke $b$ with bearings $b^2$, $b^3$, and attaching means; a balance-wheel A, having a knife-edge $a$, calibrating weight $a^2$, and differentiating member D with sliding adjusting weight C; a flexible carrier F and a portion H of hygroscopic substance, and a counterweight, depending from the respective members of said flexible carrier.

2. An instrument of the class described, comprising a support; a graduated scale carried thereby, and means to permit universal adjustment of said support and its attachment to a suitable base; a balance-wheel in said support, said wheel having a calibrating weight and an indicating member extended opposite said scale and provided with a differentiating weight adjustable slidingly on said indicating member; and a flexible carrier depending from said balance-wheel and supporting at one side a portion of hygroscopic substance and at the other side a counterweight.

In testimony whereof I have signed my name to this specification in the presence of two subscribing witnesses.

WILLIAM D. HARTSHORNE.

Witnesses:
WILLIAM M. ROGERS,
CHARLES J. McNAMARA.